US010372998B2

(12) United States Patent
Richards et al.

(10) Patent No.: US 10,372,998 B2
(45) Date of Patent: Aug. 6, 2019

(54) OBJECT RECOGNITION FOR BOTTOM OF BASKET DETECTION

(71) Applicant: Indaflow LLC, Omaha, NE (US)

(72) Inventors: Jacob D. Richards, Omaha, NE (US); Joel Thiessen, Nevada, MO (US)

( * ) Notice: Subject to any disclaimer, the term of this patent is extended or adjusted under 35 U.S.C. 154(b) by 107 days.

(21) Appl. No.: 15/671,618

(22) Filed: Aug. 8, 2017

(65) Prior Publication Data

US 2018/0039841 A1 Feb. 8, 2018

Related U.S. Application Data

(60) Provisional application No. 62/372,131, filed on Aug. 8, 2016.

(51) Int. Cl.

| | |
|---|---|
| ***G06K 9/00*** | (2006.01) |
| ***G06K 19/07*** | (2006.01) |
| ***G06K 7/10*** | (2006.01) |
| ***G06T 7/20*** | (2017.01) |
| ***G06K 9/62*** | (2006.01) |
| ***G06T 7/90*** | (2017.01) |
| *G06Q 30/06* | (2012.01) |

(52) U.S. Cl.

CPC ..... *G06K 9/00771* (2013.01); *G06K 7/10722* (2013.01); *G06K 9/6202* (2013.01); *G06K 19/07* (2013.01); *G06T 7/20* (2013.01); *G06T 7/90* (2017.01); *G06K 2209/21* (2013.01); *G06Q 30/0633* (2013.01); *G06T 2207/10016* (2013.01); *G06T 2207/10024* (2013.01); *G06T 2207/30232* (2013.01)

(58) Field of Classification Search

CPC ............. G06K 9/00201; G06K 9/3241; G06K 9/4628; G06K 9/6273; G06K 2209/17; G06N 3/04; G06N 5/046; G06T 7/90; G06T 2207/20084; G07G 1/0009; G07G 1/0036; G06G 1/01

See application file for complete search history.

(56) References Cited

U.S. PATENT DOCUMENTS

| | | | | | |
|---|---|---|---|---|---|
| 5,485,006 | A | 1/1996 | Allen et al. | | |
| 6,741,177 | B2 | 5/2004 | Ballantyne | | |
| 7,246,745 | B2 | 7/2007 | Hudnut et al. | | |
| 7,868,759 | B2 | 1/2011 | Zimmerman | | |
| 2003/0184440 | A1 * | 10/2003 | Ballantyne | A47F 10/04 | 340/568.5 |
| 2005/0189411 | A1 * | 9/2005 | Ostrowski | A47F 9/045 | 235/383 |
| 2005/0189412 | A1 * | 9/2005 | Hudnut | A47F 9/046 | 235/383 |

(Continued)

FOREIGN PATENT DOCUMENTS

WO WO 2017146595 8/2017

*Primary Examiner* — Edward Park

(74) *Attorney, Agent, or Firm* — Y. Kamaal Patterson

(57) ABSTRACT

A checkout lane management system is described that uses object recognition to detect whether one or more items is under a shopping cart during a customer checkout process. The checkout lane management system may comprise one or more of cameras for collecting a stream of images focused on a checkout lane. The checkout lane management system may also comprise one or more of a display device and a speaker device as part of a checkout lane device for displaying a BOB indicator or sounding the BOB indicator.

11 Claims, 8 Drawing Sheets

(56) References Cited

U.S. PATENT DOCUMENTS

| | | | | |
|---|---|---|---|---|
| 2006/0147087 | A1* | 7/2006 | Goncalves | G06K 9/3233 382/103 |
| 2006/0290494 | A1* | 12/2006 | O'Brien | A47F 9/046 340/568.5 |
| 2007/0084918 | A1* | 4/2007 | Tabet | A47F 9/046 235/383 |
| 2008/0088444 | A1 | 4/2008 | Rosebush | |
| 2014/0002646 | A1* | 1/2014 | Scheffer | H04N 7/18 348/143 |
| 2016/0300212 | A1* | 10/2016 | Cordova | G06Q 20/208 |
| 2018/0033066 | A1 | 2/2018 | Liu et al. | |
| 2018/0039841 | A1* | 2/2018 | Richards | G06K 9/00771 |

* cited by examiner

1

OBJECT RECOGNITION FOR BOTTOM OF BASKET DETECTION

BACKGROUND OF THE INVENTION

Checkout lanes at retail store locations like grocery stores present risk of loss for retailers during each customer checkout process at those retail stores. Shopping carts are typically designed to comprise a basket and a lower tray. The lower tray is often used for large items such as laundry detergent, boxed canned beverages, packaged sets of paper towels, and/or bags of pet food. Relatedly, items placed on the lower tray of a shopping cart often have a higher than average price per unit compared to items that are typically placed in the basket of the shopping cart.

Currently, retail store clerks operating a checkout lane are limited in their tools to evaluate shopping carts entering into a checkout lane. Clerks (or cashiers) often have easy visibility into the basket itself; however, clerks have less visibility into whether there are items on the lower tray of the shopping cart. While baskets to shopping carts can have wire framing that permit a person to see through to the lower tray, that view to the lower tray becomes obstructed by objects in the basket from a top-down view. Additionally, clerks are often stationary at the checkout lane's register without an opportunity to move around the checkout lane to establish a more direct line of sight with the lower tray to check for any items on the lower tray.

This limitation on the clerk's ability to move for a more direct line of sight can result from a variety of reasons, including a need to checkout items as quickly as possible due to high volumes of customers and/or a need or pressure to not imply a distrust of the customers checking out through the checkout lane. As a result, retail store locations can, and often do, experience losses from unidentified items passing through checkout lanes on the lower trays of shopping carts, whether due to customers failing to remember items are on the lower trays or customers intentionally avoiding payment obligations for such items.

SUMMARY OF THE INVENTION

The present invention enables a checkout lane management system that manages one or more checkout lanes to a retail store. One or more cameras capture a stream of images focused each of the checkout lanes to the retail store. The stream of images are processed and analyzed to determine a bottom-of-basket (BOB) status for each checkout lanes. The BOB status indicates whether a shopping cart at the checkout lane has any items on a lower tray of the shopping cart that need to be scanned and paid for. The BOB status is then translated to a BOB indicator that is communicated to a corresponding checkout lane device at the checkout lane. The BOB indicator alerts the cashier at the checkout lane of the presence of items on the lower tray of the shopping cart.

A lane management system in accordance with the present invention includes at least one camera, a computing device comprising a plurality of computing components, and a checkout lane device, where the checkout lane device may comprise an electronic approval button. The computing device of lane management system comprises an evaluation component, a collection component, an analyzing component, a translation component, and a communication component.

BRIEF DESCRIPTION OF THE DRAWINGS

For a more complete understanding of the invention and some advantages thereof, reference is now made to the following descriptions taken in connection with the accompanying drawings in which.

DETAILED DESCRIPTION

Figure 1:
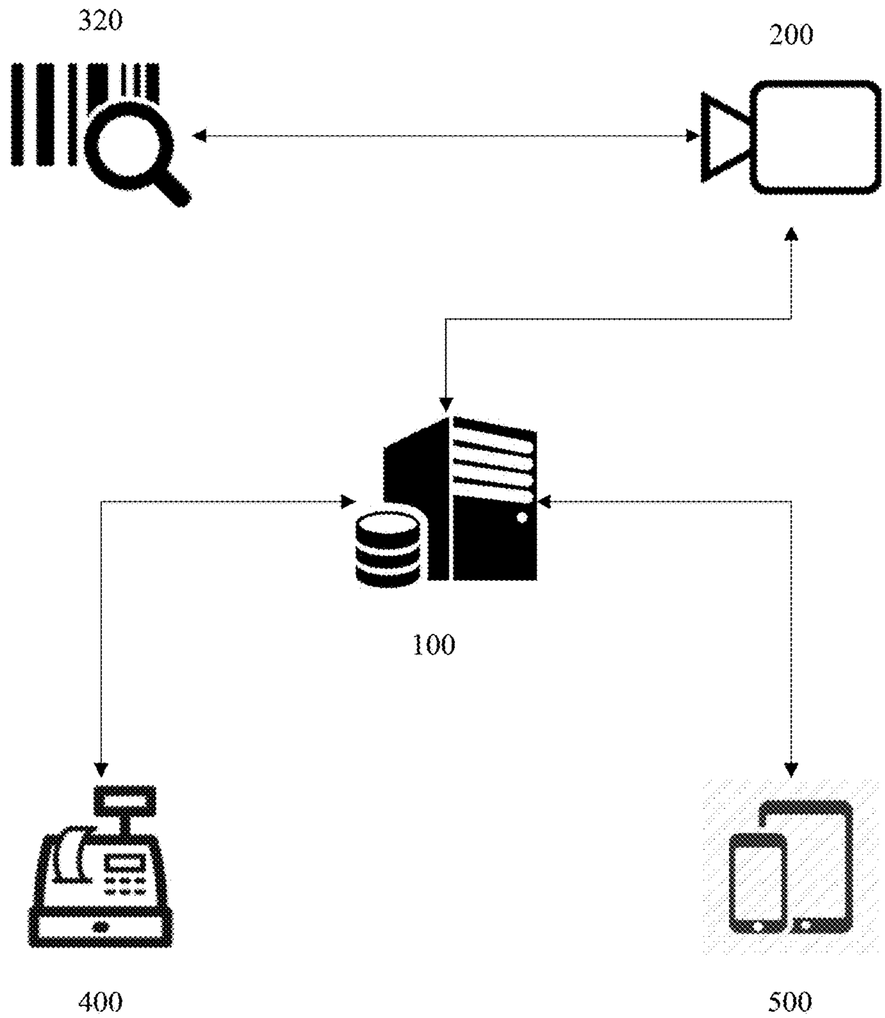
FIG. 1 is a high level view of connected system components.

In accordance with the present disclosure, a lane management system 1 is described that enables identification of whether one or more items 330 are on a lower tray 310 of a shopping cart 300 in a checkout lane 2 of a retail store location. As seen in FIG. 1, a computing device 100 from the system 1 receives and processes images from one or more cameras 200 positioned to capture a stream of images at the checkout lane 2. The computing device 100 from the system 1 may further route communications and information to a checkout lane device 400. The checkout lane device 400 operates, at least in part, as a cash register to account for a customer's items for purchase and receive payment from the customer purchasing such items to complete the customer's business transaction with the retail store. The computing device 100 may further route communications and information to one or more manager devices 500.

Figure 2:
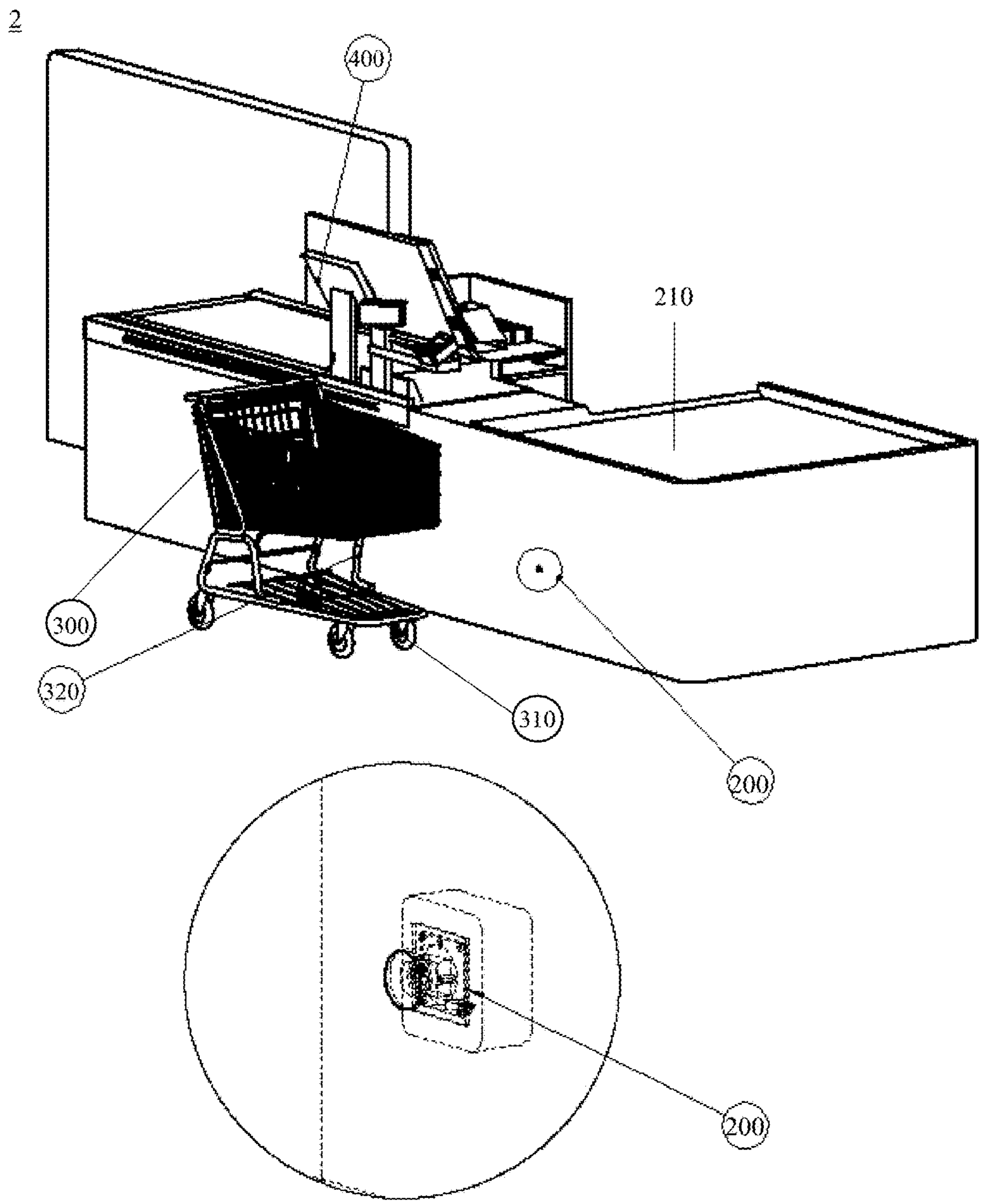
FIG. 2 is an exemplary view of a checkout lane of the present disclosure.
Figure 3:
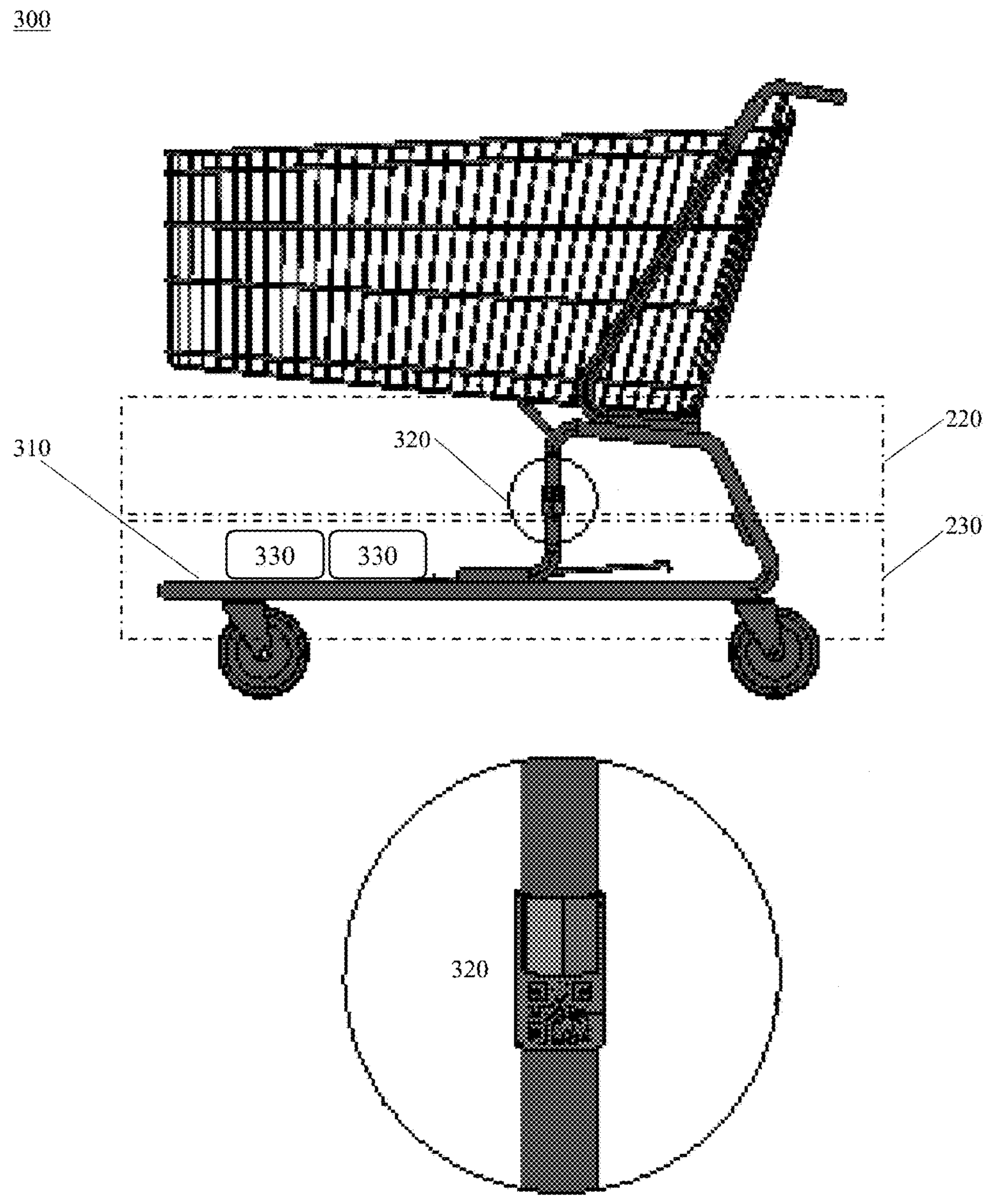
FIG. 3 is an exemplary view of a shopping cart.
Figure 4:
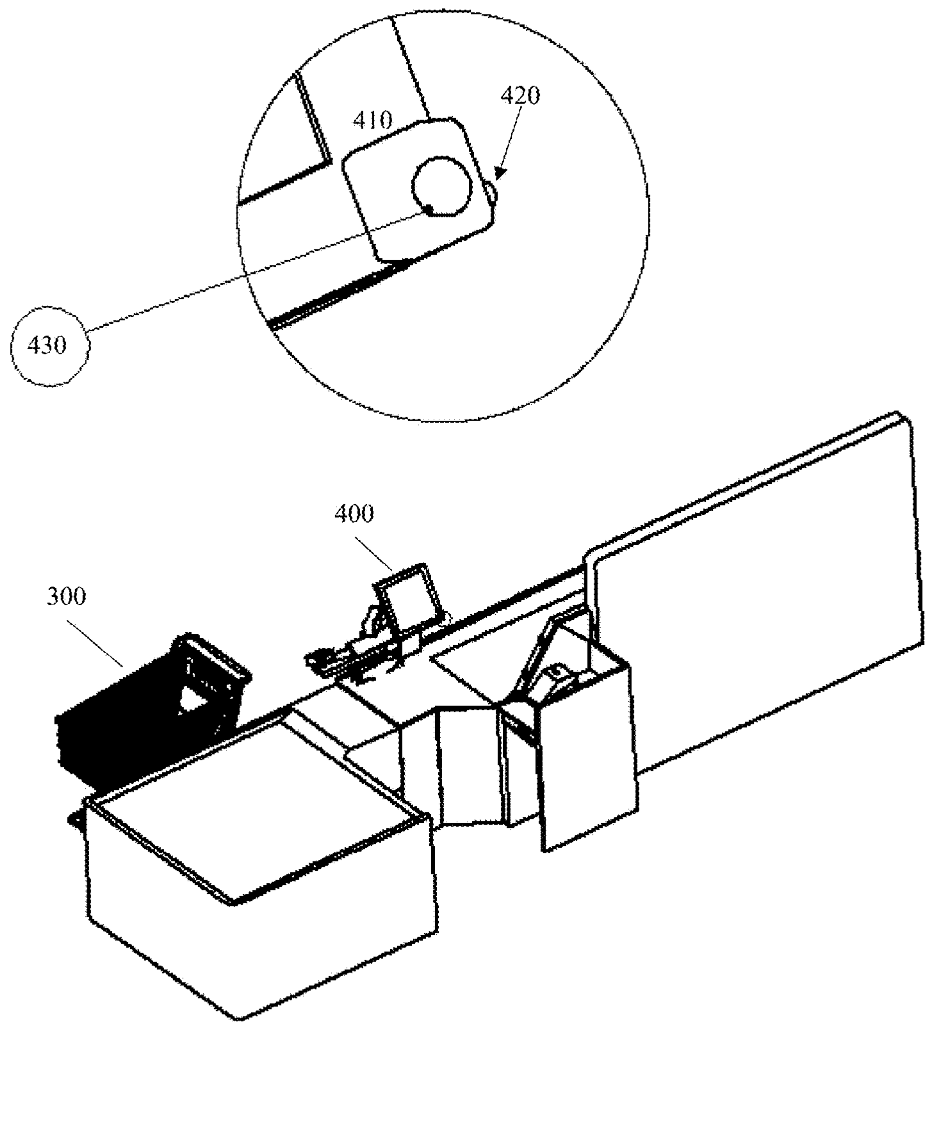
FIG. 4 is an exemplary view of an electronic approval button at a checkout lane.
Figure 5:
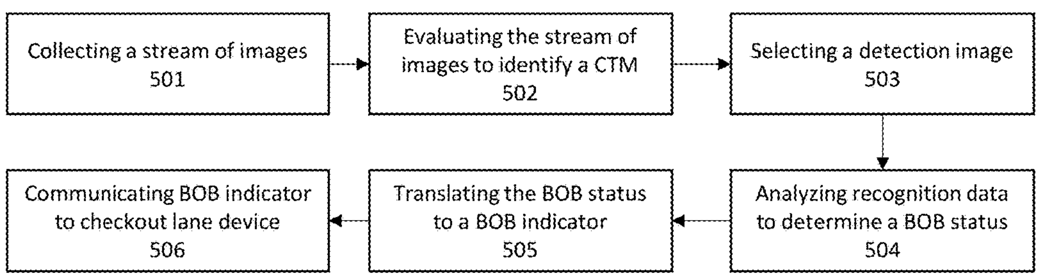
FIG. 5 is an exemplary method of collecting images for a checkout lane.

As seen in FIG. 2, the system 1 includes at least one camera 200 to collect a stream of images from a checkout lane 2, including images that may have shopping carts 300 exemplified in FIG. 3. FIG. 5 provides an exemplary set of steps for collection and processing of the stream of images from the at least one camera 200 at the checkout lane 2. The one or more cameras 200 may be positioned in a number of locations at the checkout lane 2. In embodiments of the present disclosure, a camera 200 may be positioned in a lower location secured to or as part of a checkout lane conveyor 210. In some such embodiments, the camera 200 may be proximal to a customer entry area of the checkout lane 2. In other such embodiments, the camera 200 may be proximal to a customer exit area of the checkout lane 2. In other embodiments of the present disclosure, a first camera may be positioned in a lower location secured to or as part of a checkout lane conveyor 210 proximal to the customer entry area of the checkout lane and a second camera may be positioned in a lower location secured to or as part of the checkout lane conveyor 210 proximal to the customer exit area. For clarity, the customer entry area and the customer exit area are separated by a distance, for example a length of the checkout lane conveyor 210 (in whole or in part).

The at least one camera 200 collects a stream of images from the checkout lane 2 and passes the stream of images to the computing device 100 for processing. Images received from a checkout lane 2 have recognition polygons cast upon the images (Step 501 of FIG. 5). The computing device 100 casts one or more recognition polygons on predetermined areas of each image from the stream of images at the checkout lane 2.

Recognition polygons may be a variety of types that associate with predetermined areas of an image. The types of recognition polygons are CTM polygons 220 and tray polygons 230. Recognition polygons are focused on particular parts of the image collected from the camera (or cameras) 200 focused on the checkout lane 2. For purposes of this disclosure, the term "recognition polygon" is used; one of ordinary skill in the art would recognize the ability to use a variety of alternative shapes for casting and collecting data from areas of an image (e.g., shapes that are triangular, rectangular, quadrilateral (e.g., trapezoidal), pentagonal, etc.).

The predetermined areas of an image that may have a recognition polygon cast for image data collection correspond to particular parts to the checkout lane 2 (or expected areas and volumes of a shopping cart 300 in the checkout lane 2). The tray polygon 230 may be associated with image data corresponding to an area and height where the stream of images are focused on the lower tray 310 of each shopping cart 300 that enters the checkout lane 2. The CTM polygon 220 may be associated with image data corresponding to an area and height where the stream of images may capture a cart tracking module (CTM) 320 on a shopping cart 300. In some embodiments of the present disclosure, the CTM 320 may be a red-green-blue (RGB) color pattern on a sticker or other substrate material secured or attached to wire framing of the shopping cart 300. In other embodiments of the present disclosure, the CTM 320 may be a QR code pattern on a sticker or other substrate material secured or attached to wire framing of the shopping cart 300. In yet other embodiments of the present disclosure, the CTM 320 may be or may further comprise a radio frequency identification (RFID) tag. In such embodiments of the present disclosure, the computing device 100 of the system 1 may comprise an RFID scanner for detecting RFID tags.

In embodiments where the CTM 320 is or further comprises an RFID tag, the computing device 100 of the system 1 may tag a detection annotation to the image captured by the camera 200 when the RFID scanner recognizes the RFID tag. The detection annotation would be readable by an evaluation component 101 (further described below) of the computing device 100 for selecting the associated image as the detection image or for selecting a subsequent image (e.g., the next image) as the detection image.

Recognition data is collected from the recognition polygons cast on each of the predetermined areas of each image. Recognition data for each pixel within the one or more areas cast by each recognition polygon may include color data and coordinate data. Recognition data for each pixel may also include (or be associated with) timestamp data collected for the image from which recognition polygons are cast. Recognition data for each recognition polygon may be stored using a data structure that organizes a combination of color data, coordinate data, and timestamp data according to: (i) which recognition polygon the recognition data originated from, (ii) which image the recognition polygon was cast upon, and (iii) which checkout lane 2 the image was collected from.

Recognition data collected from the one or more CTM polygons 220 is analyzed to iteratively identify the CTM 320 of a shopping cart 300 (Step 502 of FIG. 5). Embodiments of the present disclosure using an iterative determination process may be responsive to a desire for continuous monitoring of a checkout lane 2 that has an "in service" status for the checkout and payment of items 330 at the retail store. Upon identification of a CTM 320 on a shopping cart 300, the computing device 100 selects a detection image from the stream of images received from the at least one camera 200 (Step 503 of FIG. 5). The detection image may be the image from the stream of images corresponding to the identification of the CTM 320. In other embodiments of the present disclosure, the detection image may be an image from the stream of images subsequent to when the identification of the CTM 320 occurs.

Color data and coordinate data comprising the recognition data collected from the one or more tray polygons 230 for the detection image is then analyzed to determine a bottom-of-basket (BOB) status for the checkout lane 2 (Step 504 of FIG. 5). The BOB status for a checkout lane 2 is a "bottom-of-basket" value associated with answering the question whether there is at least one item on the lower tray 310 of a shopping cart 300 going through a checkout lane 2.

Analyzing recognition data to determine a BOB status for a checkout lane 2 may include the comparison of baseline data against recognition data from images collected at the checkout lane. Baseline data comprises color data and coordinate data for times when a checkout lane 2 is known to have a checkout in progress with a shopping cart 300 in the checkout lane 2. Baseline data provides a baseline for what a shopping cart 300 looks like without any items 330 on a lower tray 310 of the shopping cart 300. Baseline data is image data for a checkout lane 2 from the one or more tray polygons 230 cast on image data collected from the checkout lane 2 with a checkout in progress and a shopping cart 300 in the checkout lane 2. The recognition polygons for baseline data are cast for each predetermined area of the checkout lane 2 that will have recognition data processed to determine the BOB status for the checkout lane 2. For example, if recognition data is collected from a tray polygon 230 cast on the images collected at a position proximal to the customer exit area of the checkout lane 2 while the checkout lane 2 has an "in service" status, then the baseline data would be recognition data collected from the tray polygon 230 cast on images collected at the same position proximal to the customer exit area but captured when the checkout lane 2 has a shopping cart 300 confirmed to not have any items on the lower tray 310 of the shopping cart 300.

In other embodiments of the invention, baseline data may further comprise training images. The training images may be a collection (or database) of images with a shopping cart 300 without any items 330 on a lower tray 310 of the shopping cart 300. Alternatively, the training images may be a collection (or database) of images with shopping carts 300 where some carts are known to have items on their lower trays and some carts are known to not have any items on their lower trays. In these embodiments where training images comprise the baseline data, machine learning techniques may be incorporated and used in the processing of the computing device 100 collecting and evaluating the stream of images and conducting comparisons of the recognition data to baseline data.

Comparison of baseline data against recognition data from images collected at the checkout lane 2 may comprise a number of image analysis techniques. Techniques may include image data subtraction, addition, calculation of one or more products, averaging, transform, and use of logical operators, among other techniques known to those of ordinary skill in the art.

In greater detail, analyzing recognition data and comparing baseline data with recognition data to determine a BOB status for a checkout lane 2 may comprise a number of steps. In embodiments of the present disclosure, the recognition data from recognition polygons cast on image data collected at the "in service" checkout lane 2 may be sampled. Sampling may be done in order to manage the number of calculations performed by the computing device 100 when analyzing a stream of images from the checkout lane 2. For example, instead of performing a comparison for all pixels from the recognition data collected for the recognition polygons, sampling may be done to perform a comparison on a subset of pixels from the recognition data. Furthering the preceding example, if each image collected at a checkout lane 2 is a 720p image with 921,600 pixels and a tray polygon 230 is one of the recognition polygons that corresponds to a total of 46,080 pixels (or 5% of the pixels to the image), then rather than performing a comparison across baseline data and recognition data for 46,080 pixels of each predetermined area, the computing device 100 may sample at a delta rate and only compare a subset of pixels (e.g., 460 pixels using a delta rate of 1 pixel per 100 pixels) for the baseline data against the recognition data for that tray polygon 230.

Figure 6A:
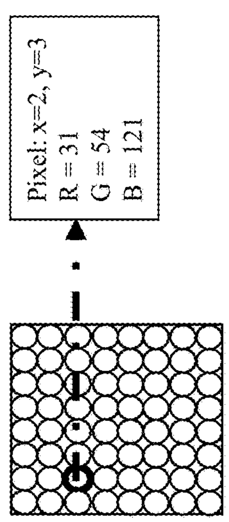
FIG. 6A-6E are figures demonstrating exemplary zoomed-in view of pixels from recognition data.
Figure 6B:
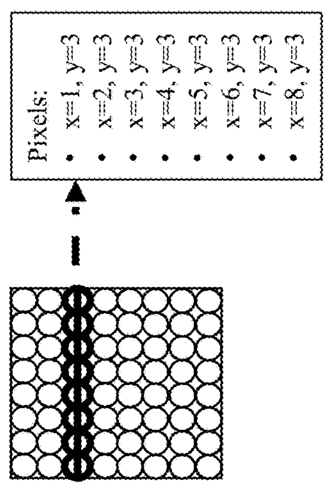
Figure 6C:
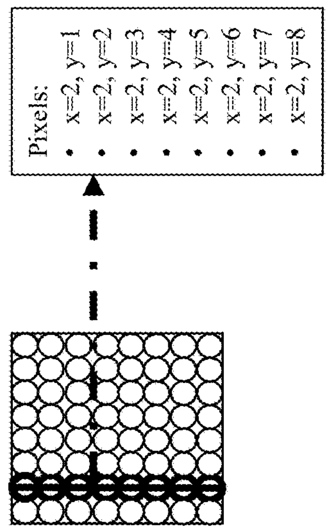
Figure 6D:
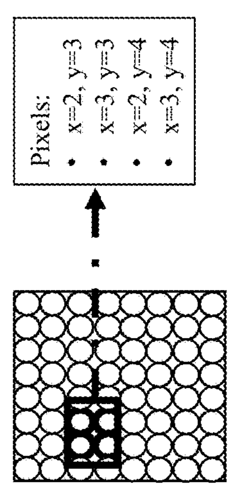
Figure 6E:
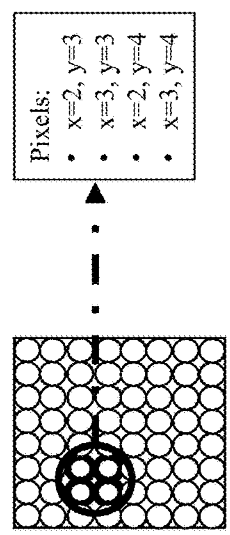

As indicated by the preceding disclosed example, recognition data for an image collected from an "in service" checkout lane 2 is compared with appropriate baseline data for a checkout lane 2 with a shopping cart 300 that is confirmed to not have any items 330 on its lower tray 310. In embodiments of the present disclosure, the recognition data from a recognition polygon is compared with the baseline data from that recognition polygon in a one-to-one correspondence of coordinate data. For example, as seen in FIG. 6A, if a pixel with coordinate data of (x=2; y=3) is captured as recognition data from a recognition polygon for an image collected from an "in service" checkout lane 2, then that pixel will be compared with the same pixel having coordinate data of (x=2; y=3) from an image captured for creation and storage of baseline data. In other embodiments of the present disclosure, the recognition data from a recognition polygon is compared with the baseline data from that recognition polygon in a relative correspondence of coordinate data. For example, if a pixel with coordinate data of (x=2; y=3) is captured as recognition data from a recognition polygon for an image collected from an "in service" checkout lane 2, then that pixel may be compared with one or more pixels having coordinate data in a related formation from an image captured for creation and storage of baseline data. As seen in FIG. 6B-6E, the related formation may be a horizontal line, a vertical line, a rectangular area, or a circular area; one of ordinary skill in the art would recognize the ability to use a variety of alternative shapes for related formations (e.g., shapes that are triangular, quadrilateral (e.g., trapezoidal), pentagonal, etc.).

Comparison of the recognition data with the baseline data (e.g., through a sampling) may then lead to a calculation of a set of delta color values. Results from the comparison of recognition data with the baseline data may be stored as the set of delta color values. In embodiments of the present disclosure, the set of delta color values may maintain its correspondence to the predetermined areas for the recognition areas analyzed through casting of the recognition polygons on an image collected at an "in service" checkout lane. The set of delta color values may then be transformed to a delta checksum. The delta checksum is a way to aggregate comparison data (i.e., color data, coordinate data, timestamp data, and delta color values) across the plurality of pixels from recognition data and baseline data into a single value. The delta checksum may then be compared with a delta threshold, which is used as an anchor for the system 1 to judge whether any items 330 are on the lower tray 310 of a shopping cart 300. For example, in some embodiments, if the delta checksum is equal to the delta threshold, then the BOB status of the checkout lane 2 may be set to "true", "1", or "active" (i.e., there is at least one item 330 on the lower tray 310 of the shopping cart 300 in the checkout lane 2). In other exemplary embodiments, if the delta checksum is less than or equal to the delta threshold, then the BOB status of the checkout lane 2 may be set to "false", "0", or "inactive" (i.e., there are not any items 330 on the lower tray 310 of the shopping cart 300 in the checkout lane 2). In still other alternative embodiments, if the delta checksum is greater than or equal to the delta threshold, then the BOB status of the checkout lane 2 may be set to "true", "1", or "active".

In related embodiments, the computing device 100 may require further use of the comparison between the delta checksum and the delta threshold before determining to set (or change) the BOB value as active or inactive, or such statuses' respective equivalents (e.g., true and false). For example, the delta checksum may be required to exceed (for example) a predetermined magnitude of difference from the delta threshold before setting the BOB status for a checkout lane 2.

Once the BOB status of a checkout lane 2 is set to active, the BOB status may be translated to a BOB indicator for the checkout lane 2 (Step 505 of FIG. 5). Translating (or converting) the BOB status to a BOB indicator may comprise signal processing to generate a BOB indicator to be displayed on a display device of the checkout lane device 400. In some embodiments of the present disclosure, the displaying the BOB indicator on the display device may comprise presenting a BOB accounting input on the display device of the checkout lane device. In further embodiments, presentation of the BOB accounting input may also require a response prior to permitting any further checkout activity through the checkout lane device 400. In alternative embodiments, translating (or converting) the BOB status to a BOB indicator may comprise signal processing to generate a BOB indicator to be sounded through a speaker device of the checkout lane device 400.

The BOB indicator is then communicated to the checkout lane device 400 of the associated checkout lane 2 by the computing device 100 (Step 506 of FIG. 5). The checkout lane device 400 may be a point of sale system (or register) at the checkout lane 2. The checkout lane device 400 may further comprise an electronic approval button 410. The electronic approval button 410 may be secured to another component part of the checkout lane device 400, such as the display device of the checkout lane device 400.

The electronic approval button 410 may comprise a light device 420 and an acknowledgment button 430. The light device 420 of the electronic approval button 410 may illuminate or flash when the BOB indicator is communicated to the electronic approval button 410 through the checkout lane device 400. In embodiments, the light device 420 of the electronic approval button 410 may be deactivated (and the light turned off) when the acknowledgment button 430 is pressed by a cashier at the checkout lane 2. In other embodiments, when the light device 420 of the electronic approval button 410 is on and illuminated (or flashing), light from the light device 420 may be a different color depending on whether the BOB indicator has been communicated to the checkout lane device 400 and electronic approval button 410. For example, light from the light device 420 may be a first color (e.g., green) during the time the checkout lane device 400 has not received the BOB indicator, and the light from the light device 420 may be a second color (e.g., red) when the checkout lane device 400 has received the BOB indicator until such time as the cashier presses the acknowledgment button 430. One of ordinary skill in the art would recognize any combination of colors may be used for the light device 420 of the electronic approval button 410.

In addition or in the alternative to using an electronic approval button 410, in some embodiments of the present invention, the BOB indicator may be displayed on the display device of the checkout lane device 400 when the BOB indicator is received by the checkout lane device 400. In embodiments, the BOB indicator may sounded on the speaker device of the checkout lane device 400. In other embodiments, the BOB indicator may be both displayed on the display device of the checkout lane device 400 and sounded on the speaker device of the checkout lane device 400. Displaying the BOB indicator on the display device and/or sounding the speaker device alerts the cashier of the checkout lane 2 that one or more items 330 are on the lower tray 310 of the shopping cart 300 in the checkout lane 2 at that time.

Figure 7:
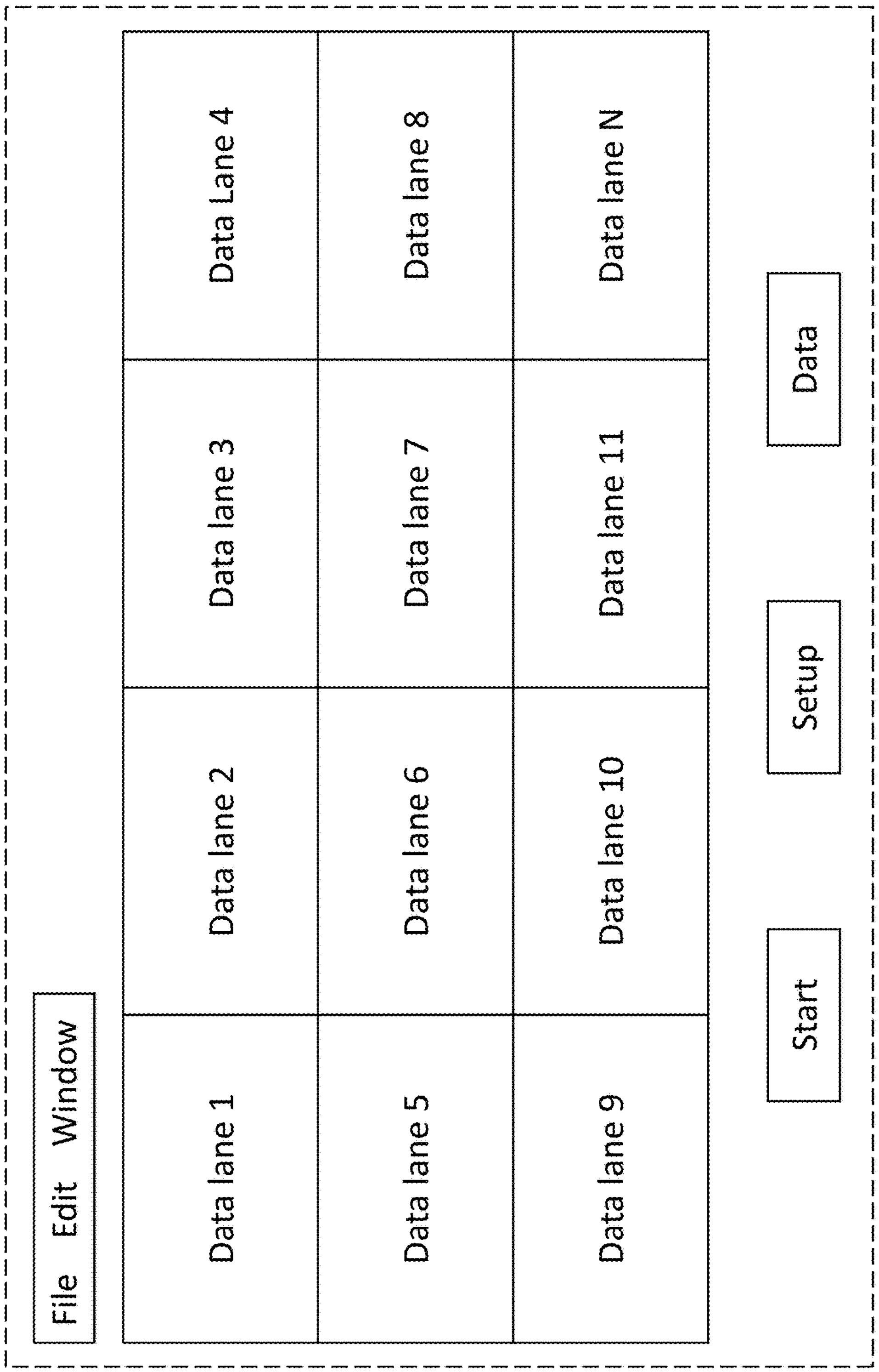
FIG. 7 is an exemplary embodiment of a user interface of a software application displaying a BOB indicator.

In addition to sending the BOB indicator to the checkout lane device 400 and, as applicable, an electronic approval button 410, the BOB indicator may also be sent to one or more manager devices 500 associated with the retail store location. The manager devices 500 may be a computational device such as a laptop, tablet, smartphone, or other similar device. The manager device 500 comprises a display with a user interface for a manager using the manager device 500 to display information associated with the BOB indicator and the checkout lane management system 1 described in the present disclosure. For example, a manager device 500 may receive the BOB indicator (e.g., through a Wi-Fi or Bluetooth connection with the lane management system 1) and display the BOB indicator for the one or more checkout lane devices 400 at the retail store through a user interface for a software application running on the manager device 500. The BOB status information for the one or more checkout lanes 2 may also be displayed on the manager device 500. An exemplary embodiment of a user interface displaying a screenshot of a software application receiving BOB status data for each checkout lane and other data from the lane management system 1 is seen in FIG. 7.

A manager device 500 or components to the lane management system 1 may also build a checkout report that is made accessible and displayable on the manager device 500. The checkout report may be a composite report for all of the checkout lanes 2 at the retail store location. A composite report may report the number of shopping carts 300 that had items 330 on the lower trays 310 of those shopping carts 300 across all of the checkout lanes 2 at the retail store location for an analyzed period of time (e.g., for a specific day, week, month and/or year). In embodiments of the invention where an electronic approval button 410 comprises the checkout lane device or displaying the BOB indicator on the display device of the checkout lane device 400 comprises presenting a BOB accounting input, the composite report may report information regarding cashier responses to the BOB indicator or BOB accounting input. In other embodiments, the checkout report may additionally or alternatively provide individual reports according to each individual checkout lane 2 from the plurality of checkout lanes 2 at the retail store location. Each individual report may report a count of the number of times items 330 were identified on the lower trays 310 of shopping carts 300 passing through that checkout lane 2 for an analyzed period of time (e.g., for a specific day, week, month, and/or year). Once the checkout report is built, the checkout report may be viewed by a manager on a manager device 500, by displaying the checkout report through a user interface (e.g., a display) of the manager device 500.

Figure 8:
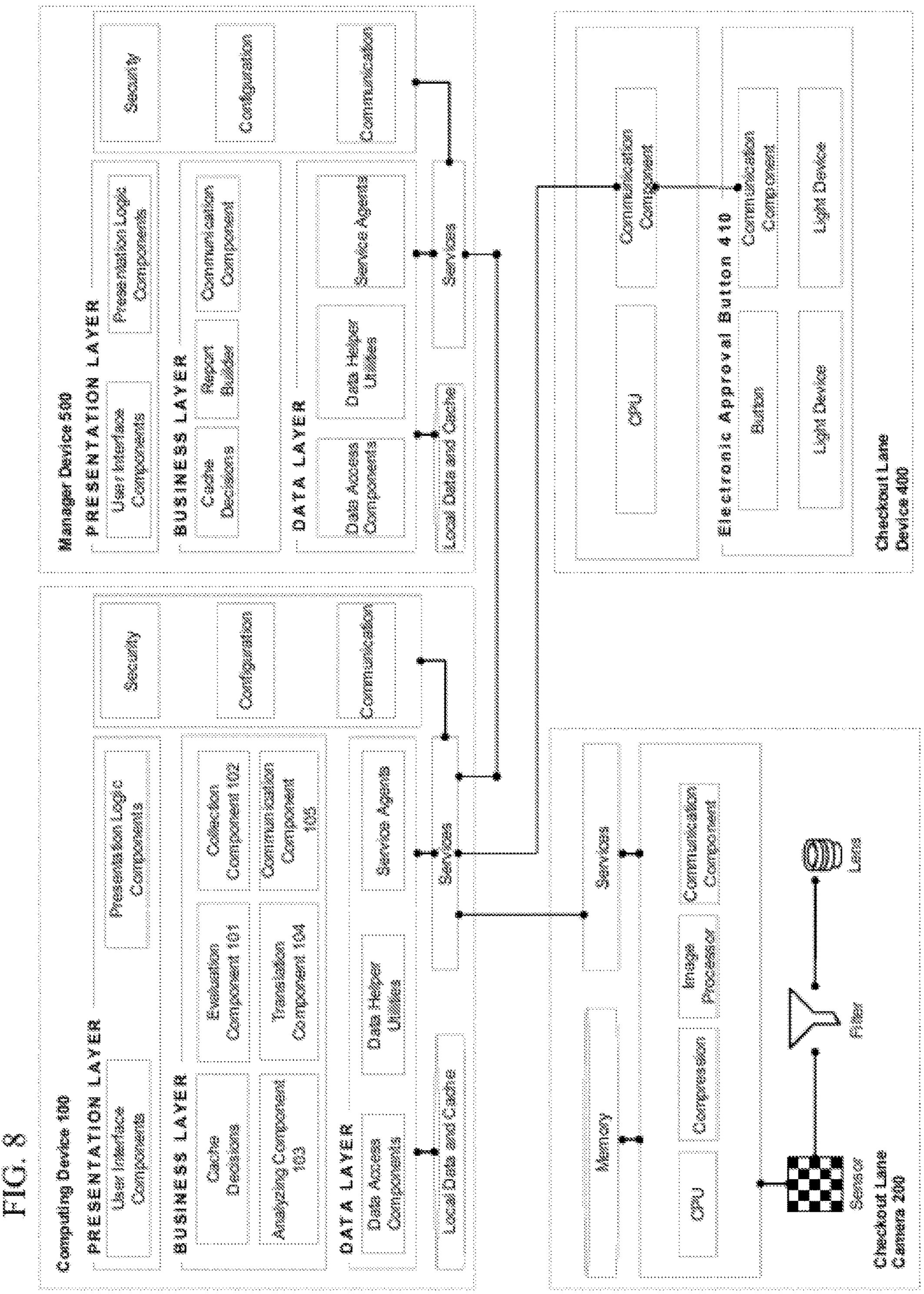
FIG. 8 is a high level architectural view of the computing device.

The lane management system 1 described in the present disclosure may comprise a number of components of hardware, software and a combination thereof. As described above, at least one camera 200 collects the stream of images at each checkout lane 2. A computing device 100 receives the stream of images from the one or more cameras 200 capturing the stream of images. A high level architectural view of the computing device 100, camera 200, manager device 500, and electronic approval button 410 is seen in FIG. 8. This computing device 100 may include an evaluation component 101, a collection component 102, an analyzing component 103, a translation component 104, and a communication component 105. In embodiments, the analyzing component is designed to include or further comprise a sampling component, a comparison component, a calculation component, a transformation component, and a setting component. In additional embodiments, the computing device or one or more manager devices (as described above) may include a report builder, as well. Also as described above, the lane management system 1 also comprises a checkout lane device 400 for each checkout lane 2, which may be a point-of-sale (POS) system or register and may further comprise an electronic approval button 410. The light device 420 of an electronic approval button 410 may comprise one or more light devices (e.g., LED, CFL, incandescent light bulb, etc.) for illuminating according to BOB indicator communicated to the electronic approval button 410.

Within the computing device 100, the evaluation component 101 evaluates the stream of images received by the computing device 100 and selects the detection image captured by the camera 200. The evaluation process by the evaluation component 101 includes casting the tray polygon and CTM polygon on the predetermined areas of each image captured by the at least one camera 200 at the checkout lane 2. The collection component 102 of the computing device 100 collects recognition data from the detection image when the CTM module is identified on a shopping cart 300 going through the checkout lane 2. Such recognition data includes color data and coordinate data. The analyzing component analyzes the recognition data from the detection image (e.g., recognition data from the area of the detection image where the tray polygon is cast). The analyzing component 103 determines a BOB status for the checkout lane 2. The translation component 104 of the computing device 100 translates the BOB status for a checkout lane 2 to a BOB indicator. The communication component 105 of the computing device 100 communicates the BOB indicator for the checkout lane to a checkout lane device 400 for the checkout lane 2.

The sampling component of the analyzing component 103 may be integrated into the operations of the analyzing component 103 to sample a plurality of pixels from the recognition data at a delta rate. The comparison component of the analyzing component 103 may be integrated into the operations of the analyzing component to compare the plurality of pixels from the sampling component with a corresponding plurality of pixels from baseline data. As explained above, correspondence may be based on coordinate data for the plurality of pixels from the recognition data and the baseline data. The calculation component of the analyzing component 103 may be integrated into the operations of the analyzing component to calculate a set of delta color values between the plurality of pixels from the sampling component and the plurality of pixels from baseline data. The transformation component of the analyzing component 103 may be integrated into the operations of the analyzing component 103 to transform the set of delta color values to a delta checksum and the comparison component compares the delta checksum against a delta threshold. The setting component of the analyzing component 103 may be integrated into the operations of the analyzing component 103 to set the BOB status for a checkout lane 2 to active or inactive depending on the delta checksum compared to the delta threshold.

While the present invention has been described above in particular detail with respect to a limited number of embodiments, other embodiments are possible as well. The particular naming of the components and their programming or structural aspect is not mandatory or significant, and the mechanisms that implement the invention or its features may have different names, formats, or protocols. Further, the lane management system 1 may be implemented via a combination of hardware and software, as described, or entirely in hardware elements. Also, the particular division of functionality between the various system components described herein is merely exemplary, and not mandatory; functions performed by a single system component may instead be performed by multiple components, as illustrated for example by the description of FIG. 8, and functions performed by multiple components may instead performed by a single component.

The operations described above, although described functionally or logically, may be implemented by computer programs stored on one or more computer readable media and executed by a processor. Computer readable storage media include, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Throughout the description, discussions using terms such as "processing" or "computing" or "calculating" or "determining" or "displaying" or "analyzing" or the like, refer to the action and processes of a particular computer system, or similar electronic computing device, that manipulates and transforms data representing or modeling physical characteristics, and which is represented as physical (electronic) quantities within the computer system memories or registers or other such information storage, transmission or display devices.

The algorithms and displays presented above are not inherently related to any particular computer or other apparatus. Various general-purpose systems may also be modified by using the teachings herein, or it may prove convenient to construct more specialized apparatus to perform the described method steps. The required structure for a variety of these systems will appear from the description above. In addition, the present invention is not described with reference to any particular programming language, any suitable one of which may be selected by the implementer.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed:

1. A method of object recognition for a cart in a checkout lane at a retail store location, the method comprising:
- collecting a stream of images from a checkout lane;
- evaluating the stream of images to identify a cart tracking module;
- selecting a detection image when identifying the cart tracking module;
- analyzing recognition data from the detection image to determine a lower tray status for the checkout lane, where the recognition data includes color data and coordinate data and analyzing recognition data includes calculating a set of delta color values between a plurality of pixels from sampling the recognition data and a plurality of pixels from baseline data,
- transforming the set of delta color values to a delta checksum,
- comparing the delta checksum against a delta threshold, and
- setting the lower tray status when the delta checksum is equal to or greater than the delta threshold;
- translating the lower tray status to a lower tray indicator; and
- communicating the lower tray indicator to a checkout lane device.

2. The method of claim 1 further comprising:
- displaying the lower tray indicator on a display device of the checkout lane device.

3. The method of claim 2 further comprising:
- presenting a lower tray accounting input on the display device of the checkout lane device that requires a response prior to permitting any further checkout activity.

4. The method of claim 1 further comprising:
- sounding the lower tray indicator on a speaker device of the checkout lane device.

5. An object recognition system for a cart in a checkout lane at a retail store location, the system comprising:
- at least one camera that collects a stream of images from a checkout lane and captures a detection image when a cart tracking module is identified;
- a computing device that receives the stream of images from the checkout lane, the computing device including
  - an evaluation component that evaluates the stream of images to identify a cart tracking module and selects the detection image,
  - a collection component that collects recognition data from the detection image, where the recognition data includes color data and coordinate data,
  - an analyzing component that analyzes the recognition data to determine a lower tray status for the checkout lane, where analysis of recognition data includes
- calculation of set of delta color values between a plurality of pixels from sampling the recognition data and a plurality of pixels from baseline data,
- transformation of the set of delta color values to a delta checksum,
- comparison of the delta checksum against a delta threshold, and
- setting the lower tray status when the delta checksum is equal to or greater than the delta threshold,
  - a translation component that translates the lower tray status to a lower tray indicator, and a communication component that communicates the lower tray indicator to a checkout lane device.

6. The system of claim 5, wherein the checkout lane device comprises a display device to display the lower tray indicator.

7. The system of claim 6, wherein the checkout lane device displays a lower tray accounting input on the display device of the checkout lane device that requires a response prior to permitting any further checkout activity.

8. The system of claim 5, wherein the checkout lane device comprises a speaker device to sound the lower tray indicator.

9. A computer program product for object recognition for a cart in a checkout lane at a retail store location, the computer program product stored on a non-transitory computer-readable medium and including instructions adapted to cause a computer to execute steps comprising:

collecting a stream of images from a checkout lane;

evaluating the stream of images to identify a cart tracking module; selecting a detection image when identifying the cart tracking module;

analyzing recognition data to determine a lower tray status for the checkout lane, where the recognition data includes color data and coordinate data and analyzing recognition data includes calculating a set of delta color values between a plurality of pixels from sampling the recognition data and a plurality of pixels from baseline data, transforming the set of delta color values to a delta checksum, comparing the delta checksum against a delta threshold, and setting the lower tray status when the delta checksum is equal to or greater than the delta threshold;

translating the lower tray status to a lower tray indicator; and communicating the lower tray indicator to a checkout lane device.

10. The computer program product of claim 9 further comprising:

displaying the lower tray indicator on a display device of the checkout lane device.

11. The computer program product of claim 10 further comprising:

presenting a lower tray accounting input on the display device of the checkout lane device that requires a response prior to permitting any further checkout activity.

* * * * *